United States Patent
Maad et al.

(10) Patent No.: US 10,067,241 B2
(45) Date of Patent: *Sep. 4, 2018

(54) CONVERTER UNIT

(71) Applicant: C-Rad Imaging AB, Uppsala (SE)

(72) Inventors: Kristofer Maad, Knivsta (SE); Gunnar Norberg, Uppsala (SE)

(73) Assignee: C-RAD IMAGING AB, Uppsala (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/824,075

(22) Filed: Nov. 28, 2017

(65) Prior Publication Data

US 2018/0088247 A1    Mar. 29, 2018

Related U.S. Application Data

(63) Continuation of application No. 14/017,656, filed on Sep. 4, 2013, now Pat. No. 9,851,452.

(51) Int. Cl.
*H01J 47/00* (2006.01)
*G01T 1/185* (2006.01)
*G01T 1/29* (2006.01)

(52) U.S. Cl.
CPC .......... *G01T 1/185* (2013.01); *G01T 1/2935* (2013.01)

(58) Field of Classification Search
CPC .......... H01J 47/02; H01J 47/06; G01T 1/185; G01T 1/2935; G01T 1/18
See application file for complete search history.

(56) References Cited

U.S. PATENT DOCUMENTS

| | | | |
|---|---|---|---|
| 3,004,165 A | 10/1961 | Minowitz et al. |
| 3,742,224 A | 6/1973 | Einstein |
| 3,971,942 A | 7/1976 | Seidman et al. |
| 4,147,949 A | 4/1979 | Yang |
| 5,453,609 A | 9/1995 | Gomez et al. |
| 5,594,253 A | 1/1997 | Bueno et al. |
| 5,712,483 A | 1/1998 | Boone et al. |
| 6,841,784 B2 | 1/2005 | Brahme et al. |
| 7,994,483 B2 | 8/2011 | Tamagawa et al. |
| 8,134,129 B2 | 3/2012 | Takanai et al. |

(Continued)

FOREIGN PATENT DOCUMENTS

| | | |
|---|---|---|
| EP | 0237327 A2 | 9/1987 |
| EP | 2377575 A1 | 10/2011 |

(Continued)

OTHER PUBLICATIONS

Jeavons, A. et al., The High-Density Avalanche Chamber for Positron Emission Tomography, EEE Transactions on Nuclear Science, vol. NS-30, No. 1:640-645 (Feb. 1983).

(Continued)

*Primary Examiner* — David Porta
*Assistant Examiner* — Mamadou Faye
(74) *Attorney, Agent, or Firm* — Porter Wright Morris & Arthur LLP (57) ABSTRACT

A converter unit configured to convert incident photons into electrons comprises multiple blind holes forming respective ionization chambers. The converter unit is preferably arranged in a detector, such as X-ray detector or absolute radiation dose measurement detector, additionally comprising an electron amplification device and/or a readout device.

27 Claims, 5 Drawing Sheets

(56) References Cited

U.S. PATENT DOCUMENTS

| | | |
|---|---|---|
| 9,851,452 B2 * | 12/2017 | Maad ..................... G01T 1/185 |
| 2002/0149305 A1 | 10/2002 | Danielsson et al. |
| 2008/0283725 A1 | 11/2008 | Hahn et al. |
| 2011/0042577 A1 | 2/2011 | Andrews et al. |
| 2011/0095174 A1 | 4/2011 | Suyama et al. |
| 2011/0180890 A1 | 7/2011 | Sato |
| 2013/0058458 A1 | 3/2013 | Desaute |

FOREIGN PATENT DOCUMENTS

| | | |
|---|---|---|
| WO | 0067043 A | 11/2000 |
| WO | 03054582 A1 | 7/2003 |
| WO | 2007/061235 A1 | 5/2007 |

OTHER PUBLICATIONS

Supplementary European Search Report dated Mar. 21, 2017 from corresponding European Application No. 14841458.4.

International Search Report and Written Opinion dated Jan. 19, 2015 from corresponding PCT/SE2014/051000.

Ostling, New Efficient Detector for Radiation Therapy Imaging using Gas Electron Multipliers, Doctoral Thesis, 2006, Stockholm, Sweden.

Iacobaeus et al, A High Position Resolution X-ray Detector: an "Edge on" Illuminated Capillary Plate Combined with a Gas Amplification Structure, IEEE Trans. Nucl. Sci. 53(2):554-561 (2006).

Chechik et al, Recent Investigations of Cascaded GEM and MHSP Detectors, IEEE Trans. Nucl. Sci. 51(5), Part 1: 2097-2103 (2004).

* cited by examiner

CONVERTER UNIT

TECHNICAL FIELD

The present embodiments generally relate to a converter unit adapted to convert incident photons into electrons, and to a detector comprising such a converter unit.

BACKGROUND

X-ray detectors are used to detect radiation and provide spatial mapping of radiation intensity in radiation-based imaging systems. Such systems involve detection of incoming radiation, such as X-rays and gamma photons, in a wide range of different applications, including medical applications.

Basically, a radiation source generates a beam in the direction of an object to be examined and a detector measures the intensity of the beam after it has passed through the object. The detector outputs information required to produce an image representing attenuation of the radiation resulting from absorption and scattering by the structure through which the beam traveled. Apart from forming an X-ray transmission image of an object an X-ray detector could also be used for measuring radiation doses.

Many radiation systems involve radiation sources, such as X-ray tubes or radiation treatment machines, associated with a very high MeV photon flow during the output pulse. The challenge is to convert as many as possible of the incident high energy photons, while at the same time preserving their spatial information, with a high precision. This makes it very difficult to achieve sufficient image quality.

A detector unit for detecting photons in the energy range 1 keV to 100 MeV is disclosed in a document [1]. The detector unit includes at least two converter layers adapted to interact with incident X-ray photons and to cause electrons to be emitted therefrom. At least one amplifier is adapted to interact with the emitted electrons and produce a multiplicity of secondary electrons and photons representing a signal proportional to the incident fluence of X-ray photons.

A document [2] is directed towards reducing spread of electrons as compared to conventional radiation detectors. The radiation detector comprises a gas electron multiplier (GEM) using interaction between radiation and gas through photoelectric effects. The GEM is arranged in a chamber filled with gas and has a single gas electron multiplication foil arranged in the chamber. This gas electron multiplication foil is made of a plate-like multilayer body composed by having a plate-like insulation layer made of a macromolecular polymer material having a thickness of 100-300 µm and flat metal layers overlaid on both surfaces of the insulation layer. The plate-like multilayer body is provided with a through-hole structure.

SUMMARY

It is a general objective to provide an improved converter unit.

It is a particular objective to provide a converter unit reducing electron and photon scattering.

These and other objectives are met by embodiments as defined herein.

An aspect of the embodiments relates to a converter unit configured to convert incident photons into electrons. The converter unit comprises multiple blind holes forming respective ionization chambers.

Another aspect of the embodiments relates to a detector comprising a converter unit according to the embodiments and an electron amplification device configured to produce further electrons from electrons formed in the converter unit. The electron amplification device is attached to the converter unit with an electrically isolating connection.

A further aspect of the embodiments relates to a detector comprising a converter unit according to the embodiments and a readout device configured to generate a signal representative of incident photons.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference numbers are used for similar or corresponding elements.

The present embodiments generally relate to a converter unit adapted to convert incident photons into electrons, sometimes denoted primary electrons in the art. The embodiments further relate to a detector comprising such a converter unit.

The converter unit of the embodiments enables, when implemented as a part of a detector, such as an X-ray detector, high sharpness in the captured picture. Such high sharpness and resolution in the picture is possible even for incident high energy photons.

Generally, there is a big challenge within X-ray detectors to convert as many as possible of incident high energy photons, while at the same time preserving their spatial information, with a high precision. A prior art solution has typically been to use several separate equidistant converter layers and electron amplification devices that amplify electrons converted from incident photons. However, such an approach generally leads to low sharpness in the formed picture due to open gas layers between the converter layers and electron amplification devices, causing scattering and lateral electron and photon distribution. This in turn leads to blurriness in the captured image.

The present embodiments have taken a radically different approach as compared to the prior art when constructing the converter unit. The present embodiments therefore relate to a converter unit comprising multiple blind holes, sometimes referred to as bottom holes in the art, forming respective ionization chambers in the converter unit.

Accordingly, an aspect of the embodiments relates to a converter unit adapted to convert incident photons into electrons. The converter unit comprises multiple blind holes forming respective ionization chambers.

Figure 1:
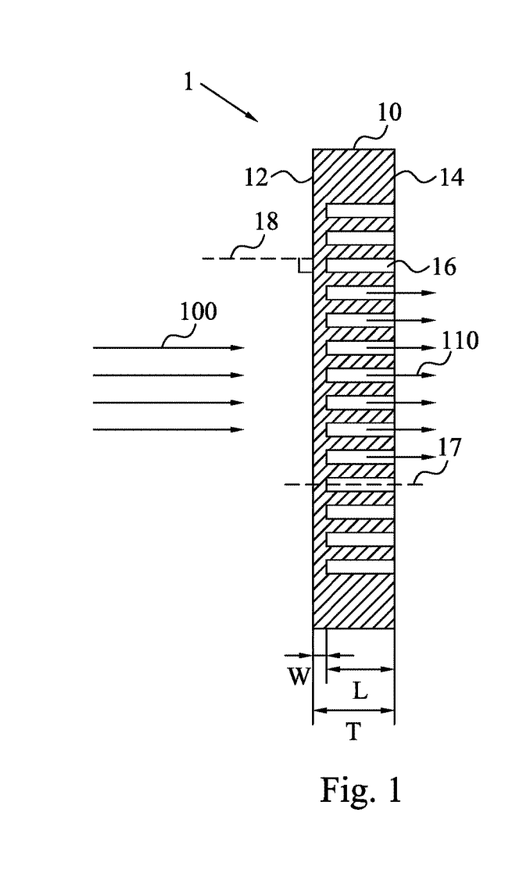
FIG. 1 is a cross-sectional view of a converter unit according to an embodiment.

This means that the blind holes 16 in the converter unit 1 extend through a portion L, see FIG. 1, of a thickness T of the converter unit 1 but do not extend through the whole thickness T of the converter unit 1. This means that there is a portion W of the thickness T of the converter unit 1 into which the blind holes 16 do not extend.

Various implementation embodiments of the general aspect will now be further described herein with reference to the drawings.

FIG. 1 is a cross-sectional view of a converter unit 1 according to an embodiment. In this embodiment, the converter unit 1 is in a form of a single, unitary converter plate 10 comprising multiple blind holes 16 extending through a portion L of the thickness T of the converter plate 10 but do not extend through the whole thickness T of the converter plate 10.

The multiple blind holes 16 are preferably arranged so that they are substantially parallel in the converter plate 10. Hence, the longitudinal axes 17 of the blind holes 16 are preferably substantially parallel with each other.

In a particular embodiment, the multiple blind holes 16 are arranged in the converter unit 1 to have a respective longitudinal axis 17 substantially parallel to a normal 18 of a main side 12, 14 of said converter unit 1. Generally, this means that the longitudinal axis 17 is at least substantially parallel to a main beam direction of the incident photons 100 hitting the converter unit 1. In a typical approach, the photons 100 are generated by a radiation source, which could be regarded, as seen from the converter unit 1, to be a point source due to that the extension of the radiation source is generally much smaller than the distance between the radiation source and the converter unit 1. Accordingly, the main beam direction will hit the converter unit 1 with an angle of incidence of close to zero relative to the normal 18 of the main side 12 of the converter unit 1. However, some of the photons 100 may in fact hit the converter unit 1 with a non-zero angle of incidence due to radiation distribution and that the radiation source does not have non-zero extension.

The converter plate 10 generally comprises a first main side 12 adapted to face the incident photons 100 and a second main side 14 opposite to the first main side 12. In a preferred embodiment, the second main side 14 facing away from the incident photons 100 comprises the entrances of the blind holes 16. Hence the blind holes 16 extend from the second main side 14 towards, but not reaching, the first main side 12 of the converter plate 10.

The converter plate 10, which in the embodiment as shown in FIG. 1, is in the form of a single, unitary piece of the converter unit 1, is preferably made of a metal material capable of converting incident photons 100 into electrons 110 through electromagnetic interaction. Electromagnetic interaction encompasses all physical interactions between photons 100 and the metal material that causes generation of electrons 110, such as through Compton effect, pair-production or photo electric effect.

Examples of suitable metal materials for the converter plate 10 include tungsten, tungsten alloys, copper, copper alloys, rhenium, rhenium alloys, molybdenum, molybdenum alloys, tantalum, tantalum alloy, chromium, chromium alloys, iron and iron alloys. Particularly, suitable materials are tungsten and tungsten alloys.

The incident photons 100 will hit the metal material of the solid portion of the converter plate 10 and are there, through the electromagnetic interaction, converted into electrons 110. The design of the converter unit 1 of the embodiments with blind holes 16 extending merely a portion L of the thickness T of the converter unit 1 will be very efficient in stopping lateral electrons and photons, i.e. traveling in a direction perpendicular to the thickness T of the converter unit 1 and perpendicular to the longitudinal axes 17 of the blind holes 16. The reason being that these scattered electrons and photons will be stopped in the walls of the blind holes 16. Consequently, the particular design of the converter unit 1 of the embodiments will reduce the amount of lateral or scattered electrons and photons exiting the converter unit 1, i.e. exiting from the second main side 14. This reduction in electron and photon scattering will in turn reduce blurring of a signal representing detected electrons, which is further discussed herein. This means that the converter unit 1 of the embodiments is designed to promote delivery of electrons 110 that are parallel or at least substantially parallel to the longitudinal axes 17 of the blind holes 16 and parallel to the normals of the first and second main sides 12, 14.

Not only the particular material of the converter plate 10 but also the thickness W of the solid part of the converter plate 10, i.e. the portion between the bottom of the blind holes 16 and the first main side 12 of the converter plate 10 facing the incident photons 100, affects the attenuation of incident low energy photons, so called beam hardening. This is useful in high energy applications in order to reduce the detection of scattered photons, which generally have lower energy, such as up to approximately 300 keV.

Each blind hole 16 will operate as an ionization chamber in which energetic electrons ejected from the converter plate 10 create a large number of ion pairs, i.e. ions and free electrons. This means that if the blind holes 16 are made deeper, i.e. larger L in FIG. 1, then the available gas volume in the blind holes 16 will increase. Accordingly, a signal, representing free electrons, will increase proportionally. The available gas volume is also dependent on the open area, e.g. diameter, of the blind holes 16.

Figure 2:
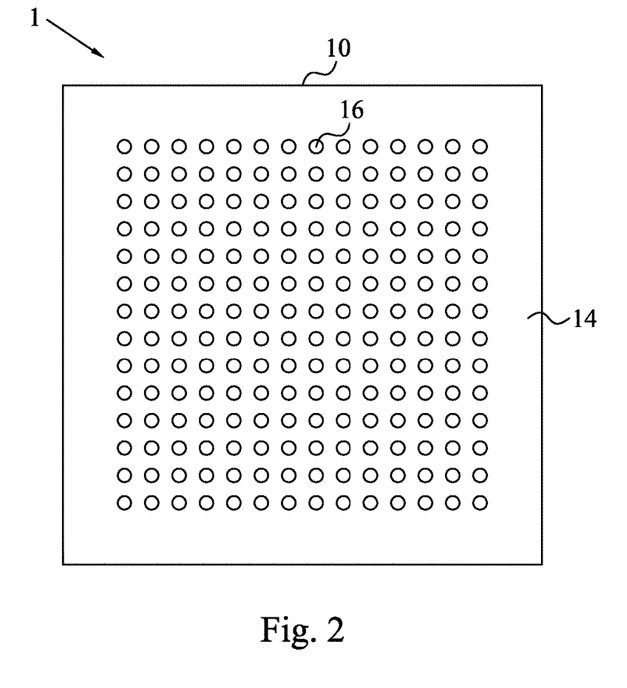
FIG. 2 is an illustration of a converter unit according to an embodiment.
Figure 3:
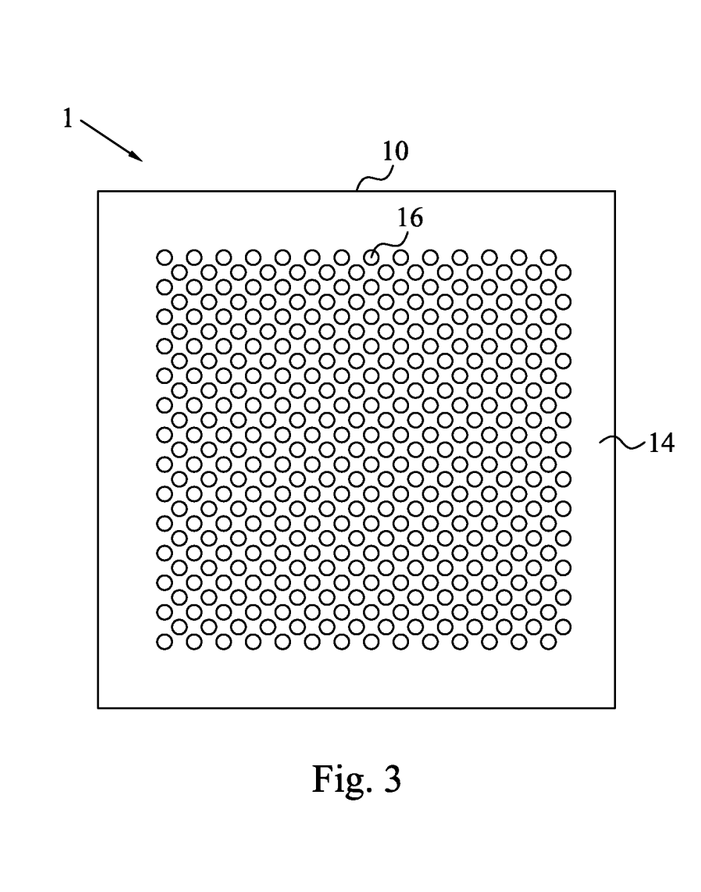
FIG. 3 is an illustration of a converter unit according to another embodiment.

FIG. 2 schematically illustrates the converter unit 1 of FIG. 1 as seen from the second main side 14, i.e. the main side comprising the entrances to the blind holes 16. In this embodiment, the blind holes 16 are arranged in a matrix of a number of rows and columns. In an alternative embodiment, which generally enables smaller distances between adjacent blind holes, the blind holes 16 can be arranged staggered relative to each other as indicated in FIG. 3. This embodiment generally has a denser arrangement of blind holes 16 and thereby a lower portion of metal material in the portion of the converter plate 10 occupied by the blind holes 16 as compared to the embodiment of FIG. 2.

The choice of hole pattern is generally a compromise between open area (active gas volume) and the ability to stop lateral electrons and photons. The hole pattern could also be influenced by the available manufacturing methods available for the various metal materials.

The blind holes 16 advantageously have circular cross-sectional area as shown in FIGS. 2 and 3. However, other cross-sectional configurations are also possible and encompassed by the embodiments, such as quadratic, rectangular, pentagon, hexagon, octagon, elliptic, etc.

Each blind hole 16 in the converter plate 10 can be seen as a gas cylinder having a closed end facing the first main side 12 and an open end at the second main side 14.

A non-limiting but illustrative example of a converter unit design is to manufacture the converter plate 10 to have thickness T of about 2.5 mm with a blind hole length L of 2 mm and thereby a remaining solid thickness portion W of 0.5 mm. The size of the converter plate 10, see FIGS. 2 and 3, could, for instance, be 500×500 mm for height×width. In a particular embodiment, the area of the second main surface 14 occupied by the matrix or pattern of blind holes 16 could be around 400×400 mm. Each blind hole 16 could have an average diameter of about 0.3 mm with an inter-hole distance of about 0.45 mm from center to center (hole pitch). If the embodiment of FIG. 3 is used, i.e. staggered blind holes 16, then a 60° staggered geometry could be used. The above presented numbers should merely been seen as illustrative example of a typical size for a converter unit 1. The embodiments are, however, not limited thereto and other dimensions of the converter plate 10 and the blind holes 16 are possible and within the scope of the embodiments.

Figure 4:
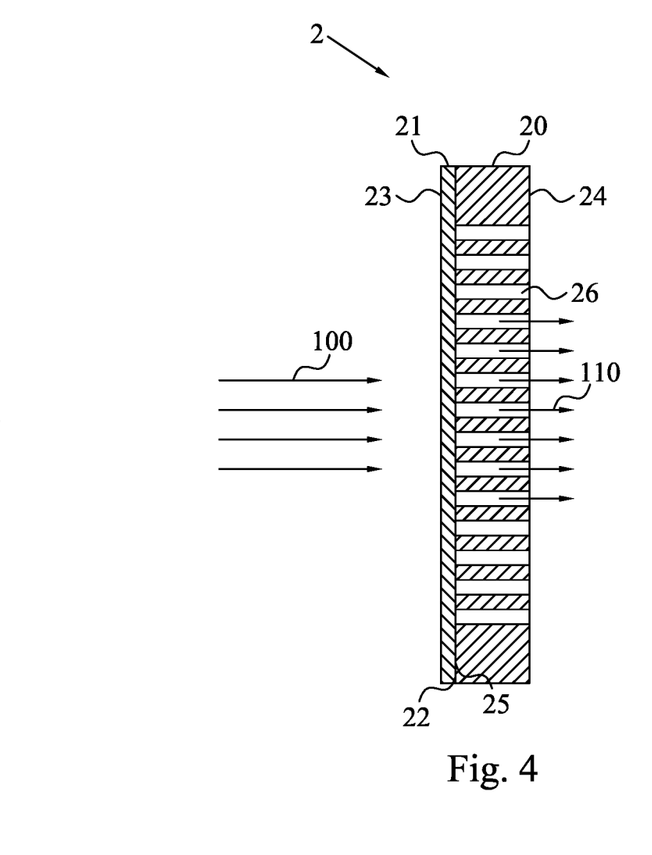
FIG. 4 is a cross-sectional view of a converter unit according to another embodiment.

FIG. 4 is a cross-sectional view of another embodiment of a converter unit 2 according to the embodiments comprising multiple blind holes. In this embodiment, the converter unit 2 is not made of a single, unitary converter plate but rather comprises a converter plate 20 with multiple through holes 26 and a solid converter plate 21.

The through holes 26 in the converter plate 20 are preferably true through holes 26 and thereby preferably extend through the whole thickness of the converter plate 20. The solid converter plate 21 is then attached to the converter plate 20 with through holes 26 as a lid for the multiple through holes 26 to thereby form a converter unit 2 with multiple blind holes. Hence, in this embodiment the portion of the converter unit 2 that contains solid converter material is made up of the solid converter plate 21. The solid converter plate 21 could therefore be regarded as a lid to the through holes 26. The combination of the solid converter plate 21 and the converter plate 20 with through holes 26 will thereby constitute the converter unit 2 with blind holes.

The solid converter plate 21 comprises a first main side 23 adapted to face the incident photons 100. A second main side 25 of the solid converter plate 21 opposite to the first main side 23 is attached to the converter plate 21 with the through holes 26. This means that the second main side 25 of the solid converter plate 21 is attached to a first main side 22 of the converter plate 20 with the through holes 26. Electrons 110 formed by the converter unit 2 exit from a second, opposite main side 24 of the converter plate 20 with the through holes 26.

The solid converter plate 21 is preferably attached with an airtight and electrically conducting connection or bond to the converter plate 20 with the through holes 26. The connection is preferably electrically conducting so that the two converter plates 20, 21 together form an electrically conducting structure, to which a voltage source can be connected, which is further discussed herein.

The connection is furthermore airtight or, more correctly, preferably gas tight. This means that gas present in through holes 26 is prevented from traveling laterally in the interface between the converter plates 20, 21. This in turn reduces the risk of lateral photons and electrons from moving within the converter unit 2 and between adjacent through holes 26. The connection preferably also prevents formation of any gas pockets between the two converter plates 20, 21.

There are various alternatives and variants that can be used in order to achieve an airtight or gastight but still electrically conducting connection between the converter plates 20, 21. Non-limiting but preferred examples include using a conductive glue, welding and diffusion bonding. It is also possible to use external mechanical fixtures that tightly interconnect the converter plates 20, 21 and keep them connected in an airtight and electrically conductive manner.

The two converter plates 20, 21 can be made of a same metal material or different metal materials. The converter plate 20 with the through holes 26 is preferably made of a metal material as previously discussed for the converter plate 10 of FIG. 1, i.e. tungsten, tungsten alloys, copper, copper alloys, rhenium, rhenium alloys, molybdenum, molybdenum alloys, tantalum, tantalum alloy, chromium, chromium alloys, iron and iron alloys. Particularly, suitable materials are tungsten and tungsten alloys. The solid converter plate 21 could also be made of a metal material selected from this group of metals and metal alloys. However, it is alternatively possible to manufacture the solid converter plate 21 from a material selected among aluminum, an aluminum alloy and stainless steel.

The converter plate 10 with blind holes 16 in FIG. 1 and the converter plate 20 with through holes 26 in FIG. 2 can be manufactured with conventional machining, for instance, using drills and mills. This production method is particularly suitable for standard metals, e.g. copper, aluminum and stainless steel. High aspect ratio holes 16, 26 can be achieved as well as blind holes 16 and through holes 26. Ultrasonic activation of the tools can increase the processing speed and extend the tool life.

Electro Discharge Machining (EDM) can be used as an alternative to conventional machining. EDM generally have similar advantages and constrains but typically somewhat lower processing speed.

Particle beam drilling, e.g. using electrons, is also an option for the metal materials.

Additive layer manufacturing, using metal powder and a laser or an electron beam to form the convert plate structure by precisely, layer by layer, melting the metal powder according to the desired geometry is also possible.

Laser drilling is also feasible for some of the preferred metal materials. A preferred metal material, i.e. tungsten, is typically difficult to laser drill and sufficient hole depth may be hard to achieve using a single converter plate 10, 20. One solution is to drill thinner sheets or plates of tungsten and then align and bond the plates together, such as using a diffusion bonding process. Such an approach will be further discussed below in connection with FIG. 5.

Another manufacture technique that can be applied if using multiple thinner sheets or plates is chemical etching. In order to improve the aspect ratio of the blind or through holes 16, 26 anisotropic etching, e.g. spray etching, could be utilized.

Figure 5:
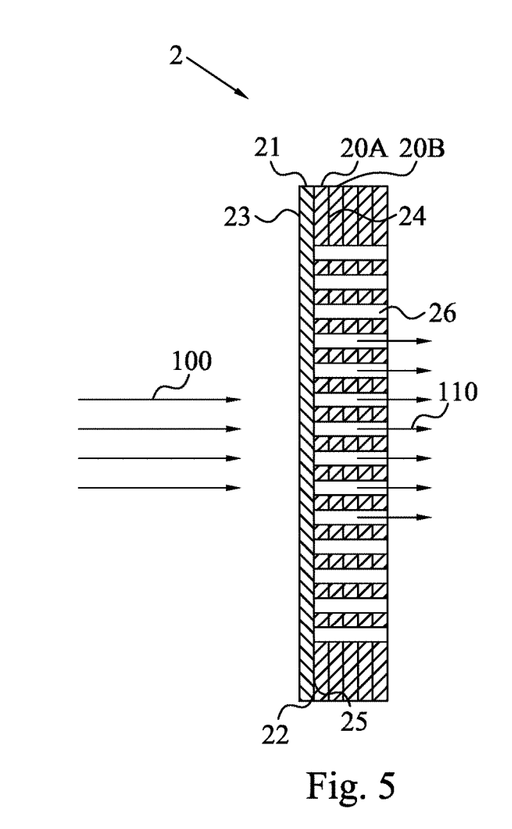
FIG. 5 is a cross-sectional view of a converter unit according to a further embodiment.

In the embodiment shown in FIG. 5 the converter unit 2 comprises multiple, i.e. at least two, converter plates 20A, 20B, each of which has multiple through holes 26 extending through the whole thickness of respective converter plate 20A, 20B. These multiple converter plates 20A, 20B are attached together to form a layered structure as shown in the figure. The multiple converter plates 20A, 20B are preferably arranged in the resulting layered structure so that the multiple through holes 26 of the converter plates 20A, 20B are aligned.

This means that the final blind holes of the converter unit 2 are formed by aligned and corresponding through holes 26 in each converter plate 20A, 20B once these are attached to each other in the layered structure as shown in FIG. 5 and the layered structure is attached to the solid converter plate 21.

As is shown in FIG. 5, the second main side 25 of the solid converter plate 21 faces a first main side 22 of a first converter plate 20A with through holes 26. A second, opposite main side 24 of the first converter plate 20B in turn faces a first main side of second converter plate 20B with through holes 26 and so on until reaching the final converter plate with through holes 26 in the stacked or layered structure.

The different converter plates 20A, 20B with through holes 26 can be attached to each other using similar techniques that have been discussed in the foregoing in connection with FIG. 4 and attaching the converter plate 20 with through holes 26 to the solid converter plate 20. This means that the connections between the multiple converter plates 20A, 20B with through holes 26 and between the first converter plate 20A with through holes 26 and the solid converter plate 21 are preferably airtight and electrically conducting connections or bonds. Preferred examples, thus, include using a conductive glue, welding and diffusion bonding. It is also possible to use external mechanical fixtures.

The multiple converter plates 20A, 20B with through holes 26 could all be made of a same metal material. However, it is in fact possible to use different metal materials for different converter plates 20A, 20B with through holes 26. The metal material(s) for the converter plates 20A, 20B with through holes 26 is(are) preferably selected from the group previously discussed herein in connection with FIG. 4.

The embodiments of the converter unit 1, 2 shown in FIGS. 1, 4 and 5 have various degrees of freedom with regard to affecting the formation of electrons and reducing the risk of electron and photon scattering. For instance, the converter unit 1 of FIG. 1 can be designed to be adapted to various applications, such as ranging from MeV to keV applications, by the selection of, for instance, the metal material of the converter plate 10; the geometry of the blind holes 16, such as shape, cross-sectional area, length L and overall pattern, including hole pitch (compare FIGS. 2 and 3); and the thickness W of the solid portion of the converter plate 10.

The converter unit 2 of FIG. 4 has one additional degree of freedom in affecting the operation characteristics of the converter unit 2 since it can use different metal materials for the solid converter plate 21 and the converter plate 20 with through holes 26. The converter unit 2 of FIG. 5 provides further degrees of freedom since it is possible to use different metal materials for different converter plates 20A, 20B with through holes 26.

Thus, the converter unit 1, 2 of the embodiments can easily be designed to be adapted to the particular characteristics that are wanted for a particular application or use of the converter unit 1, 2.

Figure 6:
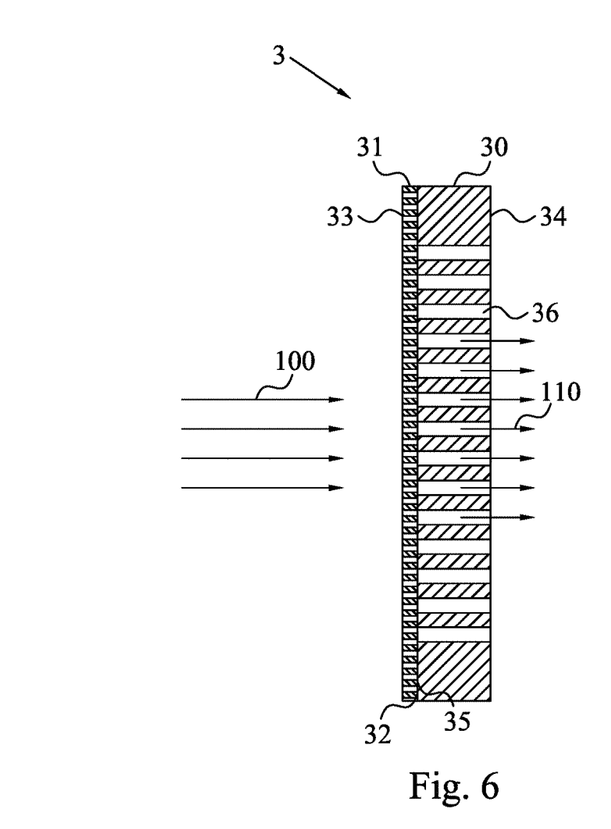
FIG. 6 is a cross-sectional view of a converter unit according to yet another embodiment.

FIG. 6 illustrates yet another embodiment of a converter unit 3 according to the embodiments. This embodiment is similar to FIG. 4 but with the difference that the solid converter plate of FIG. 4 is replaced by an anti-scatter grid 31. Hence, the converter unit 3 comprises a converter plate 30 with multiple through holes 36 and an anti-scatter grid 31 attached to the converter plate 30 as a lid for the through holes 36 to thereby form multiple blind holes of the converter unit 3.

An anti-scatter grid 31 is a device adapted to limit the amount of radiation scatter. It is generally constructed of a series of alternating parallel strips of lead, or another attenuating metal material, and a radiolucent substance, such as a plastic. A primary X-ray beam of photons 100 passes through the radiolucent strips as it travels roughly parallel to them. Scattered radiation, which has deviated from the primary X-ray beam, cannot easily pass through the anti-scatter grid 31 as it encounters the lead strips at an angle and is attenuated or lost from the primary X-ray beam.

The anti-scatter grid 31 has a first main side 33 adapted to face the incident photons 100 and a second main side 35 opposite to the first main side 33 and attached to a first main side 32 of the converter plate 30. A second main side 34 of the converter plate opposite to the first main side 32 is facing the direction in which electrons 110 exit the converter unit 3.

The anti-scatter grid 31 is preferably attached to the converter plate 30 with an airtight and electrically conducting connection. This connection can be in the form of any the embodiments discussed in the foregoing with regard to the connection between the solid converter plate and a converter plate with through holes.

A variant of the converter unit 3 of FIG. 6 is to have the anti-scatter grid 31 and a layered structure of multiple converter plates 30 with through holes 36 as shown in FIG. 5.

In an embodiment, at least a portion of the walls of the blind holes 16 in the converter unit 1, 2, 3 of the embodiments can be coated with a photoelectric converting layer. In addition, or alternatively, at least a portion of the first main side 23 or the second main side 25 of the solid converter plate 21 in FIG. 4 or 5 could be coated with a photoelectric converting layer. In this latter case, it is generally preferred to provide the photoelectric converting layer on at least a portion of the second main side 25 and in particular to at least the portion of the second main side 25 aligned with the through holes 26. This means that the photoelectric converting layer is preferably provided at the bottom of the blind holes. This approach is also possible with the converter unit 1 as shown in FIG. 1 where the photoelectric converting layer can be applied to the bottom of the blind holes 16 in addition to, or alternatively to, on the walls of the blind holes 16.

The photoelectric converting layer(s) can be included in the converter unit 1, 2, 3 in order to customize the conversion efficiency for selected photon energies.

The photoelectric converting layer(s) is(are) typically made of a metal selected among alkali, bi-alkali and multialkali metals. Non-limiting, but preferred examples, include Cs—I, Cs—Te, Na—K—Sb—Cs, Sb—K—Cs, Sb—Rb—Cs and Sb—Cs.

The converter unit of the embodiments is preferably included as a part of a detector. Various detector embodiments incorporating a converter unit will now be further described herein.

An aspect of the embodiments relates to a detector comprising a converter unit of the embodiments, such as any of the converter units 1, 2, 3 discussed in the foregoing in connection with FIGS. 1-6. In this aspect, the detector also comprises an electron amplification device configured to produce further electrons from the electrons exiting the converter unit. The electron amplification device is attached to the converter unit with an electrically isolating connection.

Figure 7:
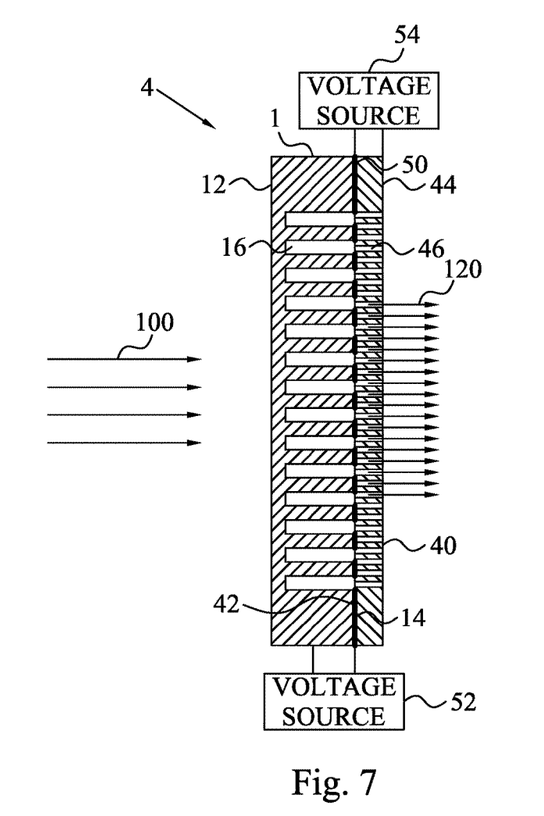
FIG. 7 is a cross-sectional view of a detector according to an embodiment.

FIG. 7 is a cross-sectional view of a detector 4 according to an embodiment. In the figure, the converter unit 1 has been exemplified by the embodiment as shown in FIG. 1. This should, however, merely be seen as an illustrative but non-limiting example. Any of the other converter unit embodiments, such as shown in FIGS. 4-6 could instead be arranged in the detector 4.

As is shown in the figure the electron amplification device 40 is preferably arranged attached to the main side 14 of the converter unit 1 comprising the entrances of the blind holes 16. Thus, the second main side 14 of the converter unit 1, being opposite to the first main side 12 facing the incident photons 100, is attached to a first main side 42 of the electron amplification device 40. Electrons 120, sometimes denoted secondary electrons in the art, formed in the electron amplification device 40 exit a second, opposite main side 44 of the electron amplification device 40.

As stated in the foregoing, the converter unit 1 and the electron amplification device 40 are electrically isolated from each other by an electrically isolating connection, bond or layer 50 between these two units. The electrically isolating connection 50 could, for instance, be in the form of an electrically isolating glue or a photo patternable dry film. Further variants include using polymides, such as Kapton (4,4'-oxydiphenylamine), or FR-4, which is a composite material composed of woven fiberglass cloth with an epoxy resin binder.

The electrical isolation 50 between the converter unit 1 and the electron amplification device 40 implies that a voltage source 52 can be connected to the converter unit 1 and the electron amplification device 40. The voltage source 52 is thereby adapted to apply a voltage and electric field across the electrical isolation layer 50 that forces electrons present in the blind holes 16 towards the electron amplification device 40.

Thus, the voltage source 52 provides the driving force (electric field) that directs electrons converted in the converter unit 1 from the incident photons 100 towards the electron amplification device 40.

The purpose of the electron amplification device 40 is, as its name indicates, to amplify the electron signal exiting the converter unit 1. Thus, the electron amplification device 40 produces a multiplicity of electrons 120 from the electrons emitted from the converter unit 1. This multiplicity of electrons 120 then represents a signal proportional to the incident fluence of photons 100.

A suitable voltage applied by the voltage source 52 could be about 50 V between the converting unit 1 and the electron amplification device 40. However, the actual voltage value depends on various design aspects, such as the depth of the blind holes 16 in the converter unit 1.

There are various implementation examples of electron amplification devices 40 that can be used in a detector 4 in order to amplify an input electron signal and output an amplified electron signal. A preferred example is a Gas Electron Multiplier (GEM).

A GEM 40 is, in its most basic design, a thin structure of two metal electrodes with an insulating foil inserted between. The structure is perforated with through holes 46 where the electron multiplication can occur. In a preferred embodiment, a voltage source 54 is connected to the two metal electrodes of the GEM 40 and is adapted to apply a voltage across the metal electrodes. This applied voltage will create large electric fields in the through holes 46.

In typical implementations, the voltage source 54 could provide a voltage within the range of 150-400 V across the two metal electrodes. This could, however, merely be seen as an illustrative but non-limiting example.

In FIG. 7 the detector 4 has been illustrated with two voltage sources 52, 54, one for providing a voltage across the electrically isolating connection 50, preferably between the converter unit 1 and the metal electrode facing the converter unit 1 and the electrically isolating connection 50, and one for providing a voltage across the metal electrodes of the GEM 40. In an alternative embodiment, a single voltage source is used to provide both these voltages, possible in connection with one or more resistors to get the correct voltage values.

Figure 8:
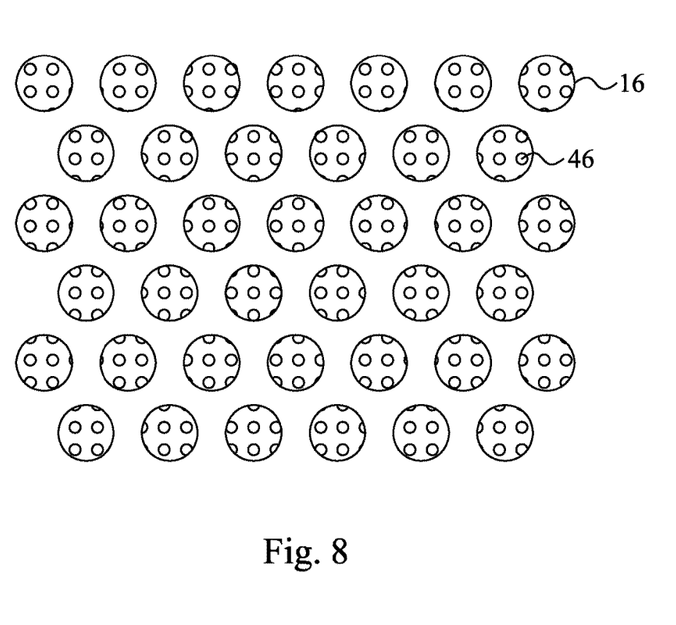
FIG. 8 schematically illustrates alignment of blind holes and through holes according to an embodiment.

In an embodiment, the multiple through holes 46 of the GEM 40 are aligned with the multiple blind holes 16 of the converter unit 1 as schematically indicated in FIG. 8. In such an embodiment, the diameter or the cross-sectional area of the through holes 46 in the GEM 40 is typically smaller than the corresponding diameter or cross-sectional area of the blind holes 16 in the converter unit 1.

It is, however, generally not necessary to align the through holes 46 with the blind holes 16. For instance, by having a GEM 40 with a smaller pitch for the pattern of through holes 46 in the GEM 40 as compared to the converter unit 1 then a certain number of through holes 46 will always match a blind hole 16 in the converter unit 1. This approach thereby reduces the need for any alignment.

GEMs 40 are well known in the art and there are various documents disclosing GEM examples [1-4].

In some prior art detectors, a stack of multiple GEMs 40 could be used to even further amplify the electron signal. Such an approach is also possible for detector 4 of the embodiments. In such a case, the multiple GEMs 40 could be separated from each other by a respective electrically insulating layer, similar to the electrically insulating layer 50 between the converter unit and the GEM 40 in FIG. 7. Alternatively, a small gas gap could be present between adjacent GEMs 40.

Other non-limiting examples of electron amplification devices 40 that can be used in the detector 4 include Micro Channel Plate (MCP), Capillary Plate (CP) and Micro-Mesh Gaseous Structure (MicroMegas).

Generally, a MCP is a slab made from highly resistive material with a regular array of tubes or slots (microchannels) leading from one face to the opposite. These tubes or slots are typically densely distributed over the whole structure. In operation, each microchannel is a continuous-dynode electron multiplier, in which multiplication of electrons takes place under the presence of a strong electric field. An electron or photon entering a microchannel through a small orifice is guaranteed to hit the channel wall since the microchannels are angled to the plate and, thus, angled relative to the angle of impact. The impact between the electron or photon and the channel wall starts a cascade of electrons that propagate through the microchannel. Accordingly, an amplification of the original signal by several orders of magnitude is possible depending on the electric field strength and the geometry of the MCP.

There are variants of MCP in the art that can also be used according to the embodiments, such as chevron MCP and Z stack MCP.

An example of a MCP design is disclosed in a document [5].

A CP is basically a thin plate-like member, in which a plurality of lead glass capillaries constituting a hollow-like shape is integrated. Thin film electrodes are formed on opposite surfaces of the CP. More information of CP design can be found in a document [7].

In a MicroMegas a gas volume is divided in two by a metallic micro-mesh. An electron or photon passing through the MicroMegas will ionize gas atoms by puling up an electron creating an electron-ion pair. By applying an electric field the electron will drift toward the micro-mesh operating as amplification electrode. When the electron enters close to the micro-mesh it enters an intense electric field. Accelerated by this high electric field, the electron reaches enough energy produce electron-ion pairs that will also ionize the gas causing an avalanche effect.

In operation, electrons formed in the converter unit 1 and having sufficient low energy will directly be captured by the electric field and transported towards the electron amplification device 40. An optional photoelectric converting layer on the surfaces defining the blind holes 16 increases the amount of such low energy electrons since the preferred alkali, bi-alkali and multialkali metals of the photoconverting layer are ionized at lower energies as compared to the preferred materials of the converter plate(s).

Electrons with higher energy and photons will typically not follow the electric field but will instead form ion tracks in the gas present in the blind holes forming electron-ion pairs. The free electrons of the electron-ion pairs generally have low energy and will therefore be transported by the electric field towards the electron amplification device 40. In this case, the blind holes 16 will operate as ionization chambers and the amount of formed electrons will be substantially proportional to the total gas volume in the blind holes.

The sum of the low energy electrons generated as described above will be amplified by the electron amplification device 40.

Figure 9:
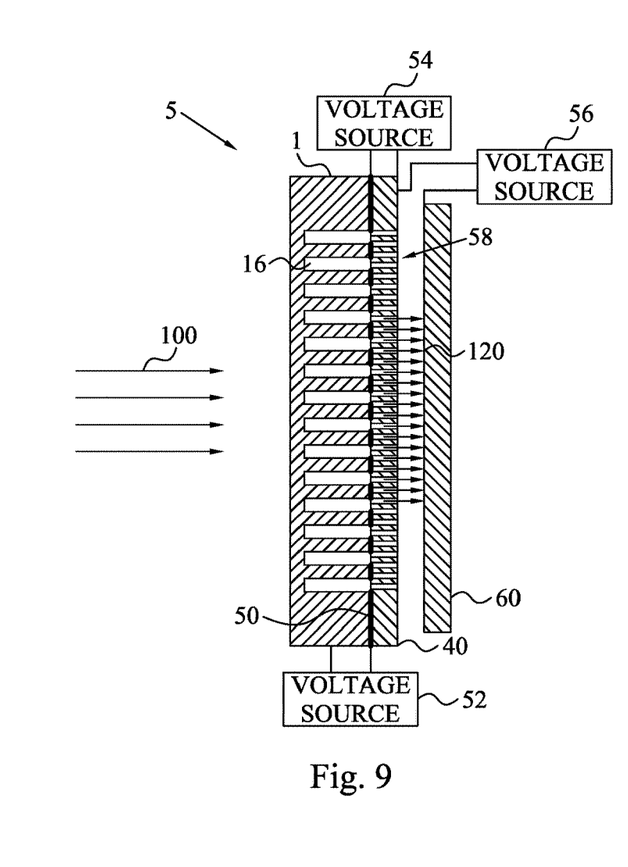
FIG. 9 is a cross-sectional view of a detector according to another embodiment.

In an embodiment, the detector 5 also comprises a readout device 60 adapted to generate a signal representative of the incident photons 100 in addition to the previously described converter unit 1 having multiple blind holes 16 and the electron amplification device 40 as shown in FIG. 9.

The readout device 60 is preferably arranged with a small gas gap 58 between the electron amplification device 40 and the readout device 40. It is, however, also possible to attach the readout device 60 to the main side of the electron amplification device 40 facing away from the converter unit 1. In such a case, an electrically isolating connection is employed, similar to the electrically isolating connection 50 between the converter unit 1 and the electron amplification device 40.

The small gas gap 58 could be in the range of about one or a few millimeters for most practical implementations.

In a preferred embodiment, a voltage source 56 is connected to the electron amplification device 40 and the readout device 60. This voltage source 56 is adapted to apply a voltage and thereby generate an electric field across the gas gap 58 to force electrons 120 exiting the electron amplification towards the readout device 60 for detection therein.

If the electron amplification device 40 is implemented by a GEM 40, the voltage source 56 is preferably connected between the metal layer of the GEM 40 facing the readout device 60 and the readout device 60.

In FIG. 9 three separate voltage sources 52, 54, 56 have been illustrated. In alternative embodiments, it could be sufficient to only use one or two voltage sources, possible together with one or more resistors, to provide the correct voltages and electric fields across the electrically isolating layer 50, across the electron amplification device 40 and across the gas gap 58.

In an embodiment, the readout device 60 is configured to generate a signal representative of an X-ray transmission image of an object based on detection of electrons 120. In this embodiment, the detector 5 is preferably in the form an X-ray detector 5 that can be used to generate an image of an object, such as a patient or a portion of a patient's body. The input photons 100 could then be from a diagnostic X-ray source or indeed from a therapeutic radiation source to be used to irradiate the patient, e.g. irradiate a tumor in the patient's body. This latter case is generally referred to as portal imaging in the art.

An example of a readout device 60 that can be used according to the embodiments is a two-dimensional (2D) charge sensitive device. There are various such 2D charge sensitive devices available in the art including, for instance, a thin-film transistor (TFT) panel.

Other possible readout devices 60 that can be used in the detector 5 include direct readout, for instance, through metallized pixels and stacked printed circuit boards (PCBs) with edge patterned pixels [6]. Further examples are also discussed in document [4], see for instance section 2.1.4 Electronic readout system.

In an embodiment, the pattern formed by the blind holes 16 in the converter unit 1, see FIGS. 2 and 3, preferably has at least substantially a same resolution as the readout device 60.

In the above described embodiment, the detector 5 is preferably in the form of an X-ray detector configured to generate a signal representative of an X-ray transmission image based on the incident X-ray beam(s) of photons 100. The embodiments are, however, not limited thereto but can alternatively be used for other detection purposes and detector implementations. For instance, in an embodiment the readout device 60 of the detector 5 is configured to generate a signal representative of an absolute radiation dose of the incident photons 100 by detection of electrons 120 exiting the converter unit 1 and the electron amplification device 40. Hence, in this embodiment the detector 5 is employed for measuring radiation doses. The detector 5 could then, for instance, be employed for radiation machine quality assurance as well as verification of treatment plans.

Figure 10:
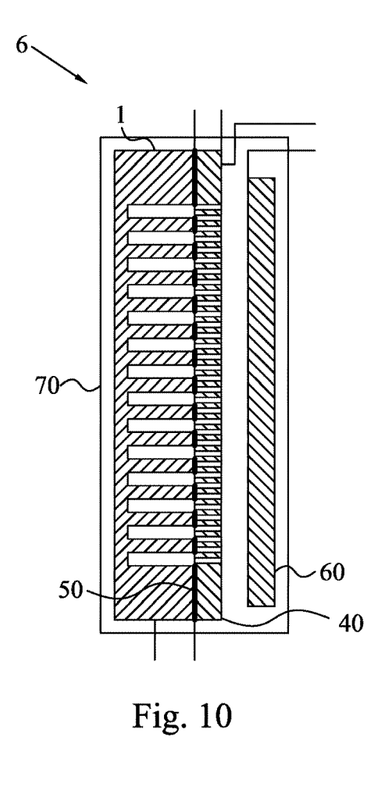
FIG. 10 is a cross-sectional view of a detector according to a further embodiment.
Figure 11:
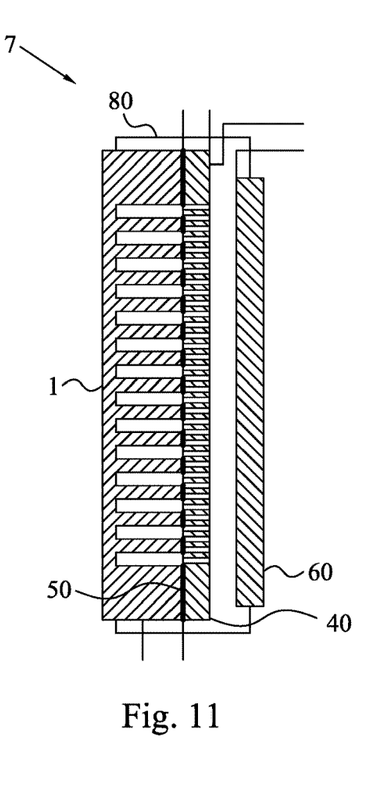
FIG. 11 is a cross-sectional view of a detector according to yet another embodiment.

The detector 6 preferably comprises a detector housing 70 as shown in FIG. 10. In such a case, the detector housing 70 comprises the converter unit 1, the electron amplification device 40 and preferably also the readout device 60. These units 1, 40, 60 could be fully encompassed within the detector housing 70 as shown in FIG. 10. In an alternative approach as shown in FIG. 11, the detector housing 80 of the detector 7 at least partly encloses the converter unit 1, the electron amplification device 40 and preferably the readout device 60. For instance, the first main side of the converter unit 1 facing the incident photons could extend outside of the detector housing 80, which is then typically connected to the end side(s) of the converter unit 1. Correspondingly or alternatively, the main side of the readout device 60 facing away from the incident photons and electrons could be present outside of the detector housing 80.

It is, however, generally preferred if the detector housing 70, 80 at least encloses portions of the converter unit 1 and the readout device 60 so that the blind holes, the electron amplification device 40 and the gap between the electron amplification device 40 and the readout device 60 will be present within the detector housing 70, 80.

The detector housing 70, 80 is preferably filled with a gas. This means that this gas will be present in the blind holes of the converter unit 1 and preferably also within the through holes of the electron amplification device 40 and in the gap between the electron amplification device 40 and the readout device 60.

Various gases, including gas mixtures, are possible and can be used according to the embodiments. Non-limiting examples include argon, xenon, carbon dioxide, dimethyl ether (DME) and mixtures thereof. However, other quenching gases or penning mixtures are possible.

In FIGS. 7, 9-10 the detector 4-7 has been illustrated as comprising the converter unit 1 and an electron amplification device 40 in addition to a preferred readout device 60. In another approach, the electron amplification device 40 could be emitted. Hence, another aspect of the embodiments relates to a detector comprising a converter unit according to the embodiments and a readout device configured to generate a signal representative of the incident photons. In such an embodiment, the converter unit and the readout device are preferably arranged in a detector, such as at least partly within a detector housing, with a small gas gap between the converter unit and the readout device. A voltage source is preferably connected to the converter unit and the readout device across the gas gap in order to force electrons formed in the converter unit towards the readout device for detection therein.

Though, this aspect of the detector works it is generally preferred to include an electron amplification device as discussed in the foregoing in order to achieve an amplification of the electrons prior to detection thereof by the readout device.

The drawings of the converter unit and detector of the embodiments should be regarded as schematic representations of various implementation embodiments. Hence, the drawings are not intended to show the including units and devices in any particular scales or relative sizes.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] U.S. patent application no. US 2002/0149305
[2] U.S. Pat. No. 7,994,483
[3] International application no. WO 2007/061235
[4] Janina Östling, New Efficent Detecto for Radiation Therapy Imaging using Gas Electron Multipliers, Doctorial Thesis, Stockholm, 2006
[5] U.S. Pat. No. 8,134,129
[6] U.S. Pat. No. 6,841,784
[7] Iacobaeous et al., Study of capillary-based gaseous detectors, *IEEE T. Nucl. Sci.* 51(3): Part 1, June 2004

The invention claimed is:

1. A converter unit adapted to convert incident photons into electrons, said converter unit comprises:
   a solid converter plate; and
   a layered structure comprising multiple converter plates, wherein
   each converter plate of said multiple converter plates comprises multiple through holes extending through the whole thickness of said converter plate;
   said multiple through holes of said multiple converter plates are aligned in said layered structure; and
   said converter plate is attached to said layered structure as a lid for said multiple through holes to form multiple blind holes forming respective ionization chambers.

2. The converter unit according to claim 1, wherein said multiple blind holes are arranged in said converter unit to have a respective longitudinal axis substantially parallel to a normal of a main side of said converter unit.

3. The converter unit according to claim 1, wherein at least a portion of walls of said multiple blind holes is coated with a photoelectric converting layer.

4. The converter unit according to claim 3, wherein said photoelectric converting layer is a made of a metal selected from a group consisting of an alkali metal, a bi-alkali metal and a multialkali metal.

5. The converter unit according to claim 3, wherein said photoelectric converting layer is a made of a metal selected from a group consisting of Cs—I, Cs—Te, Na—K—Sb—Cs, Sb—K—Cs, Sb—Rb—Cs and Sb—Cs.

6. The converter unit according to claim 1, wherein said solid converter plate comprises:
   a first main side adapted to face said incident photons; and
   a second main side opposite to said first main side and attached to said layered structure.

7. The converter unit according to claim 6, wherein at least a portion of at least one of said first main side and said second main side is coated with a photoelectric converting layer.

8. The converter unit according to claim 7, wherein said photoelectric converting layer is a made of a metal selected from a group consisting of an alkali metal, a bi-alkali metal and a multialkali metal.

9. The converter unit according to claim 7, wherein said photoelectric converting layer is a made of a metal selected from a group consisting of Cs—I, Cs—Te, Na—K—Sb—Cs, Sb—K—Cs, Sb—Rb—Cs and Sb—Cs.

10. The converter unit according to claim 1, wherein
   said multiple converter plates are made from a metal material selected from the group consisting of tungsten, a tungsten alloy, copper, a copper alloy, rhenium, a rhenium alloy, molybdenum, a molybdenum alloy, tantalum, a tantalum alloy, chromium, chromium alloys, iron and iron alloys; and
   said solid converter plate is made from a metal material selected from the group consisting of tungsten, a tungsten alloy, copper, a copper alloy, rhenium, a rhenium alloy, molybdenum, a molybdenum alloy, tantalum, a tantalum alloy, chromium, chromium alloys, iron, iron alloys, aluminium, an aluminium alloy and stainless steel.

11. A detector comprising:
   a converter unit according to claim 1 adapted to convert incident photons into electrons; and
   an electron amplification device adapted to produce further electrons from said electrons.

12. The detector according to claim 11, wherein said electron amplification device is attached to said converter unit with an electrically isolating connection.

13. The detector according to claim 12, wherein said electrically isolating connection is selected from a group consisting of an electrically isolating glue, a photo patternable dry film and a polymide.

14. The detector according to claim 11, wherein said converter unit comprises:
   a first main side adapted to face said incident photons; and
   a second main side opposite to said first main side and comprising entrances of said multiple blind holes, wherein said electron amplification device is facing said second main side.

15. The detector according to claim 11, further comprising a voltage source connected to said converter unit and said electron amplification device and adapted to force electrons present in said multiple blind holes towards said electron amplification device.

16. The detector according to claim 11, wherein said electron amplification device is selected from a group consisting of a Gas Electron Multiplier (GEM); a Micro Channel Plate (MCP); a Capillary Plate (CP); and a Micro-Mesh Gaseous Structure (MicroMegas).

17. The detector according to claim 16, wherein
said electron amplification device is a GEM comprising multiple through holes; and
at least a portion of said multiple through holes are aligned with said multiple blind holes.

18. The detector according to claim 11, further comprising a readout device adapted to generate a signal representative of said incident photons.

19. The detector according to claim 18, further comprising a voltage source connected to said electron amplification device and said readout device and adapted to force electrons exiting said electron amplification device towards said readout device.

20. The detector according to claim 18, wherein said readout device is arranged with a gas gap between said electron amplification device and said readout device.

21. The detector according to claim 18, wherein said readout device is adapted to generate a signal representative of an X-ray transmission image of an object based on detection of electrons.

22. The detector according to claim 18, wherein said readout device is a two-dimensional charge sensitive device.

23. The detector according to claim 22, wherein said two-dimensional charge sensitive device is a thin-film transistor, TFT, panel.

24. The detector according to claim 18, wherein said readout device is adapted to generate a signal representative of an absolute radiation dose of said photons based on detection of electrons.

25. The detector according to claim 18, wherein a pattern formed by said blind holes in said converter unit has at least substantially a same resolution as said readout device.

26. The detector according to claim 11, further comprising a detector housing comprising said electron amplification device and at least a portion of said converter unit, wherein said detector housing is filled with a gas and said gas is present in said blind holes.

27. The detector according to claim 26, wherein said gas is selected from a group consisting of argon, xenon, carbon dioxide, dimethyl ether or mixtures thereof.

* * * * *